US007879967B2

(12) United States Patent
Ebert et al.

(10) Patent No.: US 7,879,967 B2
(45) Date of Patent: Feb. 1, 2011

(54) MODIFIED POLYCARBONATES, POLYESTER CARBONATES AND POLYESTERS HAVING IMPROVED ELONGATION BEHAVIOR AND FLAME RESISTANCE

(75) Inventors: Wolfgang Ebert, Krefeld (DE); Alexander Karbach, Krefeld (DE); Alexander Meyer, Düsseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 323 days.

(21) Appl. No.: 12/061,790

(22) Filed: Apr. 3, 2008

(65) Prior Publication Data

US 2008/0249234 A1 Oct. 9, 2008

(30) Foreign Application Priority Data

Apr. 3, 2007 (DE) .................... 10 2007 015 948

(51) Int. Cl.
*C08G 77/00* (2006.01)
*C08G 77/04* (2006.01)
*C08G 63/695* (2006.01)
*C08L 83/00* (2006.01)

(52) U.S. Cl. .................. 528/26; 528/43; 528/271; 524/588

(58) Field of Classification Search ............ 528/26, 528/43; 524/588
See application file for complete search history.

(56) References Cited

U.S. PATENT DOCUMENTS

| 2,964,794 A | 12/1960 | Peilstocker et al. |
| 2,991,273 A | 7/1961 | Hechelhammer et al. |
| 2,999,835 A | 9/1961 | Goldberg |
| 2,999,846 A | 9/1961 | Schnell et al. |
| 3,085,992 A | 4/1963 | Lee et al. |
| 3,148,172 A | 9/1964 | Pittsfield |
| 3,271,367 A | 9/1966 | Schnell et al. |
| 3,494,885 A | 2/1970 | Thompson et al. |
| 3,553,167 A | 1/1971 | Schnell |
| 3,752,048 A | 8/1973 | Tokutomi et al. |
| 4,269,964 A | 5/1981 | Freitag et al. |
| 4,386,186 A | 5/1983 | Maresca et al. |
| 4,600,753 A | 7/1986 | Freitag et al. |
| 4,661,580 A | 4/1987 | Ranade |
| 4,663,374 A | 5/1987 | Sonoda et al. |
| 4,680,371 A | 7/1987 | Rosenfeld et al. |
| 4,680,372 A | 7/1987 | Rosenfeld |
| 4,982,014 A | 1/1991 | Freitag et al. |
| 5,126,428 A | 6/1992 | Freitag et al. |
| 5,130,460 A | 7/1992 | Kamei et al. |
| 5,155,250 A | 10/1992 | Parker et al. |
| 5,210,247 A | 5/1993 | Haberle et al. |
| 5,227,458 A | 7/1993 | Freitag et al. |
| 5,401,578 A * | 3/1995 | Lucarelli et al. ............ 428/407 |
| 5,466,554 A * | 11/1995 | Sacripante et al. ......... 430/109.4 |
| 5,502,134 A | 3/1996 | Okamoto et al. |
| 5,530,083 A | 6/1996 | Phelps et al. |
| 5,795,876 A * | 8/1998 | Wright et al. ................. 514/63 |
| 5,962,435 A * | 10/1999 | Mao et al. ..................... 514/63 |
| 6,596,840 B1 | 7/2003 | Kratschmer et al. |
| 6,740,730 B1 | 5/2004 | Kratschmer et al. |
| 7,432,327 B2 * | 10/2008 | Glasgow et al. ............ 525/106 |
| 2004/0220330 A1 * | 11/2004 | DeRudder et al. .......... 524/837 |
| 2005/0101757 A1 * | 5/2005 | Glasgow et al. ............ 528/196 |
| 2006/0148986 A1 * | 7/2006 | Glasgow et al. ............ 525/100 |

FOREIGN PATENT DOCUMENTS

| DE | 1031507 | 6/1958 |
| DE | 1137167 | 9/1962 |
| DE | 1570703 | 2/1970 |
| DE | 1495626 | 6/1971 |
| DE | 1785137 | 1/1972 |
| DE | 2036052 | 1/1972 |
| DE | 2063050 | 7/1972 |
| DE | 2119799 | 11/1972 |
| DE | 2232977 | 2/1973 |
| DE | 2211956 | 10/1973 |
| DE | 2701173 | 7/1978 |
| DE | 3500807 | 7/1985 |
| DE | 3832396 | 2/1990 |
| EP | 0026120 | 4/1981 |
| EP | 0026121 | 4/1981 |
| EP | 0026684 | 4/1981 |
| EP | 0028030 | 5/1981 |
| EP | 0039845 | 11/1981 |
| EP | 0079075 | 5/1983 |
| EP | 0089801 | 9/1983 |
| EP | 0091602 | 10/1983 |
| EP | 0097970 | 1/1984 |
| EP | 0146887 | 7/1985 |
| EP | 0156103 | 10/1985 |
| EP | 0234913 | 9/1987 |
| EP | 0240301 | 10/1987 |

(Continued)

*Primary Examiner*—Tae H Yoon
(74) *Attorney, Agent, or Firm*—Connolly Bove Lodge & Hutz LLP

(57) ABSTRACT

The present invention relates to polycarbonate, polyester carbonate and polyester having end groups derived from alkylsiloxane-substituted phenols, as well as to the use of phenolic compounds having alkylsiloxane substituents as chain terminators in the preparation of polycarbonate, polyester carbonate and polyester, as well as to mouldings and extrudates produced from these polymers, to processes for the preparation of the polymers, and to novel phenolic compounds of formula (2).

13 Claims, No Drawings

FOREIGN PATENT DOCUMENTS

| | | |
|---|---|---|
| EP | 0269324 | 6/1988 |
| EP | 0353594 | 2/1990 |
| EP | 0412407 | 2/1991 |
| EP | 0479107 | 4/1992 |
| EP | 0500131 | 8/1992 |
| EP | 0634445 | 1/1995 |
| FR | 1561518 | 3/1969 |
| GB | 905072 | 9/1962 |
| GB | 1122003 | 7/1968 |
| GB | 1229482 | 4/1971 |
| GB | 1341318 | 12/1973 |
| GB | 1367790 | 9/1974 |
| GB | 1592724 | 7/1981 |
| JP | 07224219 | 8/1995 |
| JP | 2002241483 | 8/2002 |
| WO | WO-99/55772 | 11/1999 |
| WO | WO-01/05866 | 1/2001 |
| WO | WO-01/05867 | 1/2001 |
| WO | WO-2006/134045 | 12/2006 |
| WO | WO-2007/020211 | 2/2007 |
| WO | WO-2007/080053 | 7/2007 |

* cited by examiner

MODIFIED POLYCARBONATES, POLYESTER CARBONATES AND POLYESTERS HAVING IMPROVED ELONGATION BEHAVIOR AND FLAME RESISTANCE

RELATED APPLICATIONS

This application claims benefit to German Patent Application No. 10 2007 015 948.1 filed Apr. 3, 2007. German Patent Application No. 10 2007 015 948.1 and the references cited therein are incorporated by reference in its entirety for all useful purposes.

1. Field of Invention

The present invention relates to the use of phenolic compounds having alkylsiloxane substituents as chain terminators in polycarbonates, polyester carbonates and polyesters, as well as to polycarbonates, polyester carbonates and polyesters having end groups derived from alkylsiloxane-substituted phenols, to moulded bodies and extrudates produced from these polymers, to processes for the preparation of the polymers and to processes for the production of the moulded bodies and extrudates.

2. Background of the Invention

Polycarbonates, polyester carbonates and polyesters modified with the alkylsiloxane-substituted phenols have improved elongation behaviour and higher flame resistance as compared with conventional polycarbonates.

For the preparation of conventional polycarbonates, monofunctional compounds based on phenol, such as, for example, phenol, 4-alkylphenols and 4-cumylphenol, are frequently used as chain terminators.

Linear alkyl-substituted and branched alkyl-substituted end groups are likewise known. Polycarbonates having alkylamino end groups are also known.

The incorporation of branched siloxane-containing chain terminators into polycarbonate are known (EP-A 0412 407). However, these end groups are branched. The aim of EP-A 0 412 407 was to provide low-entanglement polymers having improved flow behaviour and improved notched impact strength. The present application describes phenols having linear substituents as chain terminators.

Silyl-terminated hydrolytically unstable polycarbonates are known (JP-A 2002-241483). These polycarbonates are used as the material for a photosensitive layer of electrophotographic photoreceptors. Unlike the polycarbonates described herein, the polycarbonates described in this reference are readily hydrolysable.

Siloxane-modified polycarbonates having improved wear resistance are also known (JP-A 07224219). They differ from the polycarbonates described herein, which are improved in terms of their elongation behaviour and flame resistance.

Flameproof polycarbonate resin compositions are known (DE-A 3500807). Unlike the known siloxane compounds, the siloxane derivatives described herein are used as chain terminators in the synthesis of polycarbonate. The siloxane compounds are thereby linked directly to the polymer chain.

Silane-ester-terminated polycarbonates are also known. (EP-A 479107). The composition of the polycarbonates described herein is different in terms of structure.

Polycarbonates having terminal siloxane compounds are known (WO 2006/134045). Unlike the method described herein, the siloxane compounds are incorporated into the polycarbonate by way of activated carbonate groups. This step is very complex, because a correspondingly OH-terminated polycarbonate block must be made available for the synthesis of the modified polycarbonate. The industrial synthesis of polycarbonate takes place either by the interfacial process or by the melt transesterification process. These compounds are not suitable for the interfacial process and have only very limited suitability for the melt transesterification process. By contrast, the chain terminators described herein are very suitable for the interfacial process.

Furthermore, the preparation method disclosed in WO 2006/134045 yields aromatic-aliphatic oligocarbonates or polycarbonates. The linking of aromatic and aliphatic radicals by way of a carbonate bridge yields materials that are markedly more thermolabile as compared with solely aromatic oligo- or poly-carbonates. By contrast, when the phenolic chain terminators according to the invention that are described herein are used, only aromatic polycarbonates are formed.

Siloxane-containing block copolycarbonates are distinguished by their mechanical properties, their stability to weathering and good flameproofing properties. Such materials are described, for example, in EP-A 500131, U.S. Pat. Nos. 5,530,083 and 5,502,134. A high outlay is required for the synthesis of these materials. For example, the hydroxyaryl-terminated siloxane block for the synthesis of the copolymer must be prepared. The incorporation of the block into the polycarbonate chain must be controlled. In the synthesis of this copolymer, cloudy translucent materials are frequently obtained. By contrast, when the polycarbonates according to the invention are incorporated, no or only negligible process adaptation is necessary as compared with conventional polycarbonate synthesis. Depending on the chain length, the incorporation of these chain terminators according to the invention yields transparent materials.

SUMMARY OF THE INVENTION

Accordingly, starting from the prior art, the object was to provide polycarbonates, polyester carbonates and polyesters having end groups, or suitable phenolic compounds for producing these end groups, which can readily be incorporated into polycarbonates and yield materials having improved elongation behaviour and at the same time high flame resistance. In addition, it is desirable that these end groups should not lead to appreciable degradation under thermal load, such as, for example, in the extrusion process or during injection moulding, or in the preparation process, for example by the melt transesterification process.

Surprisingly, it has now been found that this object is achieved by the use of phenolic chain terminators which are linked via an ether bridge to an alkylsiloxane substituent. These chain terminators, or the end groups formed therefrom in the polycarbonate, result in the desired properties of improved flame resistance combined with improved elongation behaviour.

The present invention provides polycarbonates, polyester carbonates and polyesters which contain end groups based on alkylsiloxane-substituted phenols, the use of such polycarbonates, and the use of phenolic compounds as chain terminators in the preparation of polymers, in particular polycarbonates, polyester carbonates and polyesters.

The present invention relates to a polycarbonate, polyester carbonate and polyester which comprises a phenolic structure of formula (1) as end group

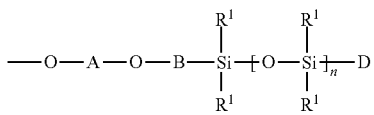

(1)

wherein
A represents an optionally substituted aryl radical,
B represents $C_1$-$C_{12}$-alkyl or $C_1$-$C_{12}$-alkoxyalkyl,
$R^1$ independently represents $C_1$-$C_{12}$-alkyl or $C_6$-$C_{12}$-aryl,
D represents $C_1$-$C_{12}$-alkyl or $C_6$-$C_{12}$-aryl, and
n represents a number (mean value) from 0 to 300.

A DETAILED DESCRIPTION OF THE INVENTION

The invention therefore provides a polycarbonate, polyester carbonate and polyester containing a phenolic structure of formula (1) as end group

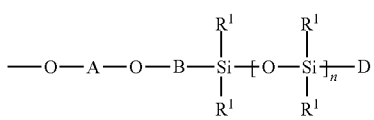

(1)

wherein
A represents an optionally substituted aryl radical, preferably

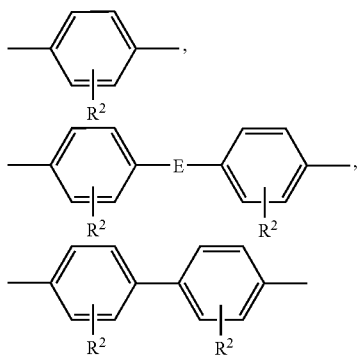

wherein
$R^2$ represents hydrogen, $C_1$-$C_{18}$-alkyl, $C_1$-$C_{18}$-alkoxy, Cl, Br or an optionally substituted aryl or aralkyl radical, such as phenyl or benzyl, particularly preferably hydrogen or $C_1$-$C_{12}$-alkyl, very particularly preferably hydrogen or $C_1$-$C_8$-alkyl, such as methyl or ethyl, and especially hydrogen,
E represents a divalent organic radical, preferably a single bond, —$SO_2$—, —CO—, —O—, —S—, $C_1$- to $C_6$-alkylene, $C_2$- to $C_5$-alkylidene or $C_5$- to $C_6$-cycloalkylidene, which can be substituted by $C_1$- to $C_6$-alkyl, preferably by methyl or ethyl, or E represents $C_6$- to $C_{12}$-arylene, which can optionally be fused to further aromatic rings containing hetero atoms,
particularly preferably E represents a single bond, $C_1$- to $C_5$-alkylene, $C_2$- to $C_5$-alkylidene, $C_5$- to $C_6$-cycloalkylidene, —O—, —SO—, —CO—, —S— or —$SO_2$—,
or E represents a radical of formula (1a) or (1b)

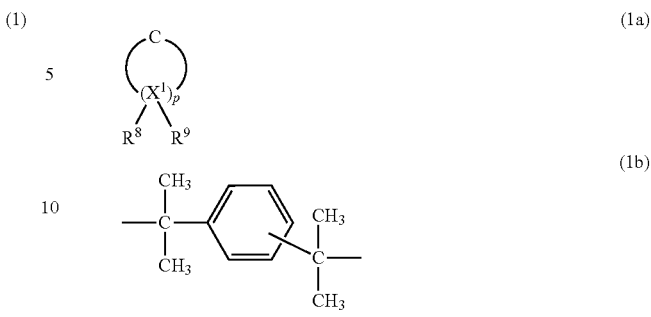

wherein
$R^8$ and $R^9$ can be chosen individually for each $X^1$ and represent, independently of one another, hydrogen or $C_1$- to $C_6$-alkyl, preferably hydrogen, methyl or ethyl, and
$X^1$ represents carbon and
p represents an integer from 4 to 7, preferably 4 or 5, with the proviso that $R^8$ and $R^9$ are simultaneously alkyl on at least one atom $X^1$,
B represents $C_1$-$C_{12}$-alkyl, $C_1$-$C_{12}$-alkoxyalkyl, preferably $C_1$-$C_6$-alkyl, $C_1$-$C_6$-alkyloxy-$C_1$-$C_6$-alkyl, for example and preferably ethyl, propyl, butyl, propoxypropyl, butoxypropyl, propoxyethyl, ethoxyethyl or ethoxypropyl, particularly preferably ethyl, propyl and butyl,
$R^1$ represents $C_1$-$C_{12}$-alkyl or $C_6$-$C_{12}$-aryl, preferably methyl or phenyl and particularly preferably methyl,
D represents $C_1$-$C_{12}$-alkyl or $C_6$-$C_{12}$-aryl, preferably $C_1$-$C_6$-alkyl, in particular methyl, ethyl, n-propyl or isopropyl, and
n represents a number from 0 to 300, preferably from 0 to 200 and particularly preferably from 10 to 100, as the mean value of a distribution.

The structural unit O-A-O is preferably derived from diphenols such as, for example, from hydroquinone, resorcinol, dihydroxydiphenyl, bis-(hydroxyphenyl)-alkanes, bis-(hydroxyphenyl)-cycloalkanes, bis-(hydroxyphenyl)sulfides, bis-(hydroxyphenyl)ethers, bis-(hydroxyphenyl) ketones, bis-(hydroxyphenyl)-sulfones, bis-(hydroxyphenyl) sulfoxides, α,α'-bis-(hydroxyphenyl)-diisopropylbenzenes, as well as alkylated compounds thereof, compounds thereof that are alkylated on the ring and compounds thereof that are halogenated on the ring. Particularly preferred structural units O-A-O are derived from hydroquinone, 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxyphenyl)-propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

The structural unit O-A-O is derived in particular from hydroquinone, 4,4'-dihydroxydiphenyl, 1,1-bis-(4-hydroxyphenyl)-phenyl-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC); very particular preference is given to hydroquinone, bisphenol A and bisphenol TMC as derived structural units.

These and further suitable diphenols are described, for example, in U.S. Pat. Nos. 2,999,835, 3,148,172, 2,991,273, 3,271,367, 4,982,014 and 2,999,846, in German Offenlegungsschriften 1 570 703, 2 063 050, 2 036 052, 2 211 956 and 3 832 396, in French patent specification 1 561 518, in the monograph "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker New York 2000, p. 72 ff".

The phenolic compounds of formula (2)

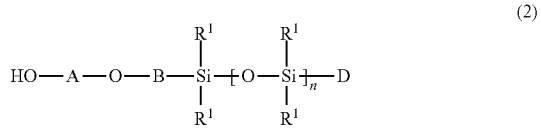

(2)

wherein the radicals have the definition give above for formula (1), are novel, and the present application relates also thereto.

The present application likewise provides the use of the compounds of formula (2) as chain terminators in the preparation of polycarbonates, polyester carbonates or polyesters.

The definitions of the radicals and the explanations given above generally or in preferred ranges can, however, also be combined with one another, that is to say between the individual ranges and preferred ranges, as desired. They apply correspondingly to the end products as well as to the precursors and intermediates.

The amount of phenolic compounds of formula (2) to be used as chain terminator is from 0.5 to 8 mol %, preferably from 2 to 6 mol %, based on moles of diphenol or diphenols used in a particular case.

In addition to the phenolic compounds of formula (2), other phenols in amounts of up to 90 mol %, preferably up to 75 mol %, in particular up to 70 mol %, based on the total amount of chain terminator used in a particular case, can be used concomitantly in the preparation of the polycarbonates, polyester carbonates and polyesters. Such other phenols can be, for example, phenol or alkyl phenols, in particular phenol, p-tert-butyl phenol, isooctyl phenol, cumyl phenol, chlorocarbonic acid esters thereof or acid chlorides of monocarboxylic acids, or mixtures of these chain terminators.

The present invention accordingly also provides the use of the phenolic compounds of formula (2), optionally in combination with other phenols, as chain terminators in the preparation of aromatic polycarbonates, aromatic polyester carbonates and aromatic polyesters, wherein the other phenols are used in amounts of up to 90 mol %, preferably up to 75 mol %, in particular up to 70 mol %, based on the total molar amount of chain terminators.

The compounds according to the invention can in principle be prepared by known methods of organic chemistry.

For example, the alkylsiloxane-modified phenols can be prepared from available hydroxy-substituted siloxane compounds and aromatic hydroxy compounds by a generally known process. The preparation method itself can be, for example, an ether synthesis. Processes for the preparation of alkylsiloxane-modified phenols are described, for example, in WO 2006/134045.

According to DE 2 119 799, the preparation of polycarbonates is carried out with the involvement of phenolic end groups, by the interfacial process as well as the process in homogeneous phase.

For the preparation of polycarbonates by the interfacial process, reference is made, for example, to H. Schnell, Chemistry and Physics of Polycarbonates, Polymer Reviews, Vol. 9, Interscience Publishers, New York 1964 p. 33 ff and to Polymer Reviews, Vol. 10, "Condensation Polymers by Interfacial and Solution Methods", Paul W. Morgan, Interscience Publishers, New York 1965, Chap. VIII, p. 325.

In addition, it is also possible to prepare the polycarbonates according to the invention from diaryl carbonates and diphenols by the known polycarbonate process in the melt, the so-called melt transesterification process, which is described, for example, in WO-A 01/05866 and WO-A 01/05867. Transesterification processes (acetate process and phenyl ester process) are additionally described, for example, in U.S. Pat. Nos. 3,494,885, 4,386,186, 4,661,580, 4,680,371 and 4,680,372, in EP-A 26 120, 26 121, 26 684, 28 030, 39 845, 39 845, 91 602, 97 970, 79 075, 14 68 87, 15 61 03, 23 49 13 and 24 03 01, as well as in DE-A 14 95 626 and 22 32 977. The use according to the invention of the siloxane-containing chain terminators is possible in these processes too. Because these substances have a higher boiling point than phenol or the phenols from which the diaryl carbonate was obtained, these substances are incorporated as chain terminator into the polycarbonate in question.

Diaryl carbonates are carbonic acid diesters of formula (3)

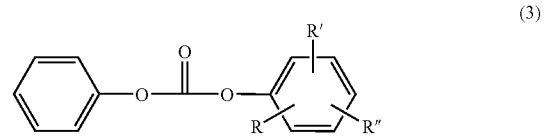

(3)

and formula (4)

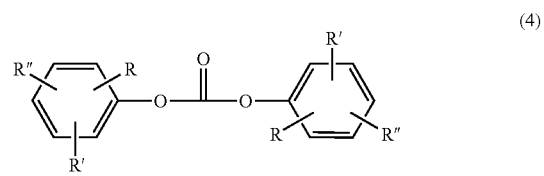

(4)

wherein R, R' and R", independently of one another, can represent H, optionally branched $C_1$-$C_{34}$-alkyl/cycloalkyl, $C_7$-$C_{34}$-alkaryl, or $C_6$-$C_{34}$-aryl or $C_6$-$C_{34}$-aryl-oxy, for example diphenyl carbonate, butyl phenyl-phenyl carbonate, di-butylphenyl carbonate, isobutylphenyl-phenyl carbonate, di-isobutylphenyl carbonate, tert-butylphenyl-phenyl carbonate, di-tert-butylphenyl carbonate, n-pentylphenyl-phenyl carbonate, di-(n-pentylphenyl) carbonate, n-hexylphenyl-phenyl carbonate, di-(n-hexylphenyl)carbonate, cyclohexylphenyl-phenyl carbonate, di-cyclohexylphenyl carbonate, phenylphenol-phenyl carbonate, di-phenylphenol carbonate, isooctylphenyl-phenyl carbonate, di-isooctylphenyl carbonate, n-nonylphenyl-phenyl carbonate, di-(n-nonylphenyl)carbonate, cumylphenyl-phenyl carbonate, di-cumylphenyl carbonate, naphthylphenyl-phenyl carbonate, di-naphthylphenyl carbonate, di-tert-butylphenyl-phenyl carbonate, di-(di-tert-butylphenyl) carbonate, dicumylphenyl-phenyl carbonate, di-(dicumylphenyl)carbonate, 4-phenoxyphenyl-phenyl carbonate, di-(4-phenoxyphenyl)carbonate, 3-pentadecylphenyl-phenyl carbonate, di-(3-pentadecylphenyl)carbonate, tritylphenyl-phenyl carbonate, di-tritylphenyl carbonate, preferably diphenyl carbonate, tert-butylphenyl-phenyl carbonate, di-tert-butylphenyl carbonate, phenylphenol-phenyl carbonate, di-phenylphenol carbonate, cumylphenyl-phenyl carbonate, di-cumylphenyl carbonate, particularly preferably diphenyl carbonate.

Suitable diphenols for the preparation of polycarbonates are those of formula (5)

$$HO-Z-OH \qquad (5)$$

in which

Z is an aromatic radical having from 6 to 30 carbon atoms which can contain one or more aromatic nuclei, can be substituted and can contain aliphatic or cycloaliphatic radicals or alkylaryls or hetero atoms as bridging members.

Z in formula (5) preferably represents a radical of formula (5a)

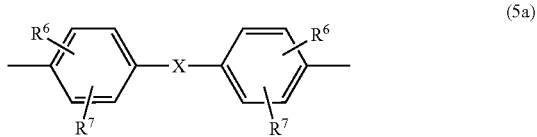

in which $R^6$ and $R^7$, independently of one another, represent H, $C_1$-$C_{18}$-alkyl, $C_1$-$C_{18}$-alkoxy, halogen, such as Cl or Br, or optionally substituted aryl or aralkyl, preferably H or $C_1$-$C_{12}$-alkyl, particularly preferably H or $C_1$-$C_8$-alkyl and very particularly preferably H or methyl, and X represents a single bond, —$SO_2$—, —CO—, —O—, —S—, $C_1$- to $C_6$-alkylene, $C_2$- to $C_5$-alkylidene or $C_5$- to $C_6$-cycloalkylidene, which can be substituted by $C_1$- to $C_6$-alkyl, preferably by methyl or ethyl, or X represents $C_6$- to $C_{12}$-arylene, which can optionally be fused to further aromatic rings containing hetero atoms.

X preferably represents a single bond, $C_1$- to $C_5$-alkylene, $C_2$- to $C_5$-alkylidene, $C_5$- to $C_6$-cycloalkylidene, —O—, —SO—, —CO—, —S—, —$SO_2$—, or a radical of formula (5c) or (5d)

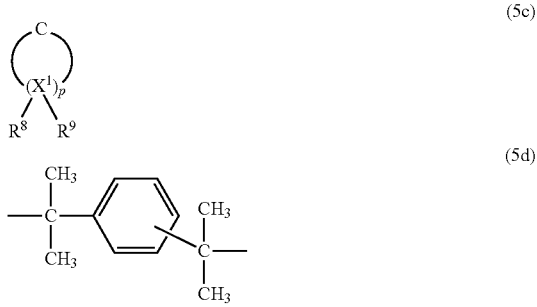

wherein $R^8$, $R^9$, $X^1$ and p have the meanings given above.

Examples of diphenols are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl)ethers, bis-(hydroxyphenyl)ketones, bis-(hydroxyphenyl)sulfides, bis-(hydroxyphenyl)-sulfones, bis-(hydroxyphenyl)sulfoxides, 1,1'-bis-(hydroxyphenyl)-diisopropylbenzenes, as well as compounds thereof that are alkylated on the ring and compounds thereof that are halogenated on the ring.

Diphenols suitable for the preparation of the polycarbonates are, for example, hydroquinone, resorcinol, dihydroxydiphenyl, bis-(hydroxyphenyl)-alkanes, bis-(hydroxyphenyl)-cycloalkanes, bis(hydroxyphenyl)sulfides, bis-(hydroxyphenyl)ethers, bis-(hydroxyphenyl)ketones, bis-(hydroxyphenyl)-sulfones, bis-(hydroxyphenyl)sulfoxides, α,α'-bis-(hydroxyphenyl)-diisopropylbenzenes, as well as alkylated compounds thereof, compounds thereof that are alkylated on the ring and compounds thereof that are halogenated on the ring.

Preferred diphenols are 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxy-phenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

Particularly preferred diphenols are 4,4'-dihydroxydiphenyl, 1,1-bis-(4-hydroxyphenyl)-phenylethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

These and further suitable diphenols are described, for example, in U.S. Pat. Nos. 2,999,835, 3,148,172, 2,991,273, 3,271,367, 4,982,014 and 2,999,846, in German Offenlegungsschriften 1 570 703, 2 063 050, 2 036 052, 2 211 956 and 3 832 396, in French patent specification 1 561 518, in the monograph "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker New York 2000, p. 72 ff".

In the case of homopolycarbonates, only one diphenol is used; in the case of copolycarbonates, a plurality of diphenols is used, it being possible, of course, for the bisphenols used, like all the other chemicals and auxiliary substances added to the synthesis, to be contaminated with impurities from their own synthesis, handling and storage, although it is desirable to work with raw materials that are as clean as possible.

The diphenols can be used either alone or in a mixture with one another; both homopolycarbonates and copolycarbonates are included.

The monofunctional chain terminators of formula (2) according to the invention that are required for adjusting the molecular weight can be supplemented with up to 90 mol % conventional chain terminators, such as, for example, phenol or alkyl phenols, in particular phenol, p-tert-butyl phenol, isooctyl phenol, cumyl phenol, chlorocarbonic acid esters thereof or acid chlorides of monocarboxylic acids, or mixtures of these chain terminators and are either fed to the reaction with the bisphenolate or bisphenolates or are added to the synthesis at any desired point in time, as long as phosgene or chlorocarbonic acid end groups are still present in the reaction mixture or, in the case of the acid chlorides and chlorocarbonic acid esters as chain terminators, as long as sufficient phenolic end groups of the polymer that is forming are available. Preferably, however, the chain terminator or terminators is/are added after the phosgenation at a location or at a point in time when no more phosgene is present but the catalyst has not yet been metered in, or they are metered in before the catalyst, together with the catalyst or in parallel therewith.

Any branching agents or branching agent mixtures that are to be used are added to the synthesis in the same manner, but conventionally before the chain terminators. Trisphenols, quaternary phenols or acid chlorides of tri- or tetra-carboxylic acids are conventionally used, or alternatively mixtures of the polyphenols or of the acid chlorides.

Some of the compounds having three or more than three phenolic hydroxyl groups which can be used are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane.

Some of the other trifunctional compounds are 2,4-dihydroxybenzoic acid, trimesic acid, cyanuric chloride and 3,3-bis-3-methyl-4-hydroxyphenyl)-2-oxo-2,3-dihydro-indole.

Preferred branching agents are 3,3-bis-(3-methyl-4-hydroxyphenyl)-2-oxo-2,3-dihydroindole and 1,1,1-tri-(4-hydroxyphenyl)-ethane.

The aromatic polycarbonates of the present invention have weight-average molecular weights $M_W$ (determined by gel permeation chromatography and calibration with polycarbonate calibration) of from 5,000 to 200,000, preferably from 10,000 to 80,000 and particularly preferably from 15,000 to 40,000 (this corresponds approximately to from 12,000 to 330,000, preferably from 20,000 to 135,000 and particularly preferably from 28,000 to 69,000, determined by calibration by means of polystyrene standard).

The relative solution viscosities are accordingly from 1.10 to 1.60, measured in methylene chloride (0.5 g of polycarbonate in 100 ml of methylene chloride at 23° C.).

The polyester carbonate according to the invention are preferably those which are composed of at least one diphenol, of at least one aromatic dicarboxylic acid and of carbonic acid.

Suitable aromatic dicarboxylic acids are, for example, orthophthalic acid, terephthalic acid, isophthalic acid, tert-butylisophthalic acid, 3,3'-diphenyldicarboxylic acid, 4,4'-diphenyl ether dicarboxylic acid, 4,4'-diphenylsulfonedicarboxylic acid, 3,4'-benzophenonedicarboxylic acid, 2,2-bis-(4-carboxyphenyl)-propane, trimethyl-3-phenylindane-4,5-dicarboxylic acid.

Of the aromatic dicarboxylic acids, particular preference is given to the use of terephthalic acid and/or isophthalic acid.

Suitable diphenols are those mentioned above for the polycarbonate preparation. The carbonic acid can be incorporated into the polyester carbonates either via phosgene or via diphenyl carbonate, depending on the chosen preparation process, that is to say whether interfacial polycondensation or melt transesterification is used for the polyester carbonate preparation.

The same applies for the aromatic dicarboxylic acids; they are used either in the form of aromatic dicarboxylic acid dichlorides in the two-phase interfacial process or in the form of dicarboxylic acid diesters in the melt transesterification process.

The preparation of the polyester carbonates according to the invention is carried out by known preparation processes, that is to say, for example, by the interfacial process or by the melt transesterification process, as already mentioned.

The polyester carbonates according to the invention can be either linear or branched in a known manner. The aromatic polyester carbonates of the present invention have mean weight-average molecular weights $M_w$ (determined by gel permeation chromatography with polystyrene calibration) of preferably from 10,000 to 250,000, particularly preferably from 15,000 to 100,000 (g/mol).

The molar ratio of carbonate units to aromatic dicarboxylate units in the polyester carbonates according to the invention is preferably from 95:5 to 5:95, particularly preferably from 90:10 to 10:90, especially preferably from 80:20 to 20:80 and very particularly preferably from 60:40 to 40:60.

Aromatic polyesters according to the invention are those comprising at least one diphenol and at least one aromatic dicarboxylic acid.

Suitable diphenols and dicarboxylic acids are those mentioned above for the polyester carbonate preparation.

The aromatic polyesters according to the invention are prepared by known preparation processes (see e.g. Kunststoff-Handbuch, Vol. VIII, p. 695 ff, Carl-Hanser-Verlag, Munich, 1973).

The aromatic polyesters according to the invention can be either linear or branched in a known manner.

The aromatic polyesters according to the invention have mean weight-average molecular weights $M_w$ (determined by the light-scattering method) of preferably from 25,000 to 70,000.

The present invention accordingly also provides a process for the preparation of the polycarbonate, polyester carbonate or polyester according to the invention from diphenols, monophenols, carbonic acid derivatives and/or dicarboxylic acid derivatives according to process conditions known per se, which process is characterised in that there are used as chain terminators monophenols of formula (2) in amounts of from 0.5 mol % to 8 mol %, preferably from 2 mol % to 6 mol %, in each case based on moles of diphenols, wherein up to 90 mol % thereof, preferably up to 75 mol %, in particular up to 70 mol %, in each case based on the total amount of chain terminators, can be replaced by other monophenols.

In the case of the interfacial polycondensation process, the chain terminators of formula (2) can be added in solution before, during or after the phosgenation. Solvents suitable for dissolving the chain terminators of formula (2) are, for example, methylene chloride, chlorobenzene or acetonitrile as well as mixtures of these solvents.

In the case of the melt transesterification process, it is possible in the process according to the invention to add the chain terminators of formula (2) to the reaction at any point in time; the addition can be divided into several portions.

Diphenols for the preparation of the polycarbonates, polyester carbonates and polyesters according to the invention can also be polymerisation products or condensation products having phenolic end groups, so that the invention also includes polycarbonates or polyester carbonates or polyesters having block structures.

The polycarbonates, polyester carbonates and polyesters according to the invention can be worked up in known manner and processed to moulded bodies of any kind, for example by extrusion or injection moulding.

Other aromatic polycarbonates and/or other aromatic polyester carbonates and/or other aromatic polyesters can also be added in known manner to the polycarbonates, polyester carbonates and polyesters according to the invention.

It is also possible to add to the polycarbonate, polyester carbonate and polyester according to the invention conventional additives for these thermoplastics, such as fillers, UV stabilisers, heat stabilisers, antistatics, colourings and pigments, in the conventional amounts; the mould release behaviour, the flow behaviour and/or the flame resistance can optionally be improved by the addition of external mould release agents, flow improvers and/or flameproofing agents (e.g. alkyl and aryl phosphites, phosphates, phosphanes, low molecular weight carboxylic acid esters, halogen compounds, salts, chalk, quartz flour, glass fibres and carbon fibres, pigments and combinations thereof. Such compounds are described, for example, in WO 99/55772, p. 15-25 and in "Plastics Additives", R. Gächter and H. Müller, Hanser Publishers 1983).

Suitable additives are described, for example, in "Additives for Plastics Handbook, John Murphy, Elsevier, Oxford 1999", in "Plastics Additives Handbook, Hans Zweifel, Hanser, Munich 2001".

Suitable antioxidants and heat stabilisers are, for example:

alkylated monophenols, alkylthiomethyl phenols, hydroquinones and alkylated hydroquinones, tocopherols, hydroxylated thiodiphenyl ethers, alkylidene bisphenols, O-, N- and S-benzyl compounds, hydroxybenzylated malonates, aromatic hydroxybenzyl compounds, triazine compounds, acylamino phenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergists, secondary antioxidants, phosphites and phosphonites, benzofuranones and indolinones.

Preference is given to organic phosphites, phosphonates and phosphanes, mostly those in which the organic radicals consist wholly or partially of optionally substituted aromatic radicals.

Suitable complexing agents for heavy metals and for neutralising traces of alkali are o/m-phosphoric acids, wholly or partially esterified phosphates or phosphites.

Suitable light stabilisers (UV absorbers) are 2-(2'-hydroxyphenyl)benzotriazoles, 2-hydroxybenzophenones, esters of substituted and unsubstituted benzoic acids, acrylates, sterically hindered amines, oxamides as well as 2,8,2-(2-hydroxyphenyl)-1,3,5-triazines; preference is given to substituted benzotriazoles such as, for example, 2-(2'-hydroxy-5'-methyl-phenyl)-benzotriazole, 2-(2'-hydroxy-3',5'-di-tert-butylphenyl)-benzotriazole, 2-(2'-hydroxy-3'-tert-butyl-5'-methyl-phenyl)-5-chlorobenzotriazole, 2-(2'-hydroxy-3',5'-tert-butyl-phenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3'',4'',5'',6''-tetrahydrophthalimido-ethyl)-5'-methylphenyl]-benzotriazole and 2,2'-methylenebis[4-(1,1,3,3-tetramethylbutyl)-6-(2H-benzotriazol-2-yl)phenol].

Polypropylene glycols, alone or in combination with, for example, sulfones or sulfonamides as stabilisers, can be used against damage by gamma radiation.

These and other stabilisers can be used individually or in combination and can be added to the polymer in the mentioned forms.

In addition, processing aids, such as mould release agents, mostly derivatives of long-chained fatty acids, can be added. Preference is given, for example, to pentaerythritol tetrastearate and glycerol monostearate. They are used alone or in a mixture, preferably in an amount of from 0.02 to 1 wt. %, based on the mass of the composition.

Suitable flame-retarding additives are phosphate esters, that is to say triphenyl phosphate, resorcinol diphosphoric acid esters, bromine-containing compounds, such as brominated phosphoric acid esters, brominated oligocarbonates and polycarbonates, as well as, preferably, salts of fluorinated organic sulfonic acids.

Suitable impact modifiers are butadiene rubber with grafted-on styrene-acrylonitrile or methyl methacrylate, ethylene-propylene rubbers with grafted-on maleic anhydride, ethyl acrylate and butyl acrylate rubbers with grafted-on methyl methacrylate or styrene-acrylonitrile, interpenetrating siloxane and acrylate networks with grafted-on methyl methacrylate or styrene-acrylonitrile.

It is further possible to add colouring agents, such as organic colourings or pigments or inorganic pigments, IR absorbers, individually, in a mixture or alternatively in combination with stabilisers, glass fibres, (hollow) glass spheres, inorganic fillers.

The polycarbonate, polyester carbonate and polyester according to the invention, optionally are in admixture with other thermoplastics and/or conventional additives, can, when processed to mouldings/extrudates of any kind, be employed wherever known polycarbonates, polyester carbonates and polyesters are already in use. On account of their property profile, they are suitable as substrate materials for sheets, multi-wall sheets, glazing, headlight lenses, lamp covers or optical data storage means, such as audio compact disks (CDs), CD-R(W)s, DVDs, DVD-R(W)s, etc., but can also be used, for example, as films in the electrical sector, as mouldings in motor vehicle construction and as sheets for coverings in the security sector. Further possible uses of the polycarbonates according to the invention are:

1. Safety glazing, which, as is known, is required in many areas of buildings, vehicles and aircraft, and also as visors for helmets.
2. Production of films, especially ski films.
3. Production of blow-moulded bodies (see, for example, U.S. Pat. No. 2,964,794), for example 1 to 5 gallon water bottles.
4. Production of transparent sheets, especially of hollow-chamber sheets, for example for covering buildings such as railway stations, greenhouses and lighting installations.
5. Production of optical data storage means.
6. For the production of traffic light housings or road signs.
7. For the production of foamed materials (see, for example, DE-B 1 031 507).
8. For the production of threads and wires (see, for example, DE-B 1 137 167 and DE-A 1 785 137).
9. As translucent plastics having a content of glass fibres for lighting purposes (see, for example, DE-A 1 554 020).
10. As translucent plastics having a content of barium sulfate, titanium dioxide and/or zirconium oxide or organic polymeric acrylate rubbers (EP-A 634 445, EP-A 269 324) for the production of transparent and light-scattering mouldings.
11. For the production of precision injection-moulded parts, such as, for example, lens holders. To this end, polycarbonates having a content of glass fibres, which optionally contain in addition approximately from 1 to 10 wt. % $MoS_2$, based on the total weight, are used.
12. For the production of parts for optical devices, especially lenses for photographic and film cameras (see, for example, DE-A 2 701 173).
13. As light transmission carriers, especially as fibre-optic cables (see, for example, EP-A 0 089 801).
14. As electrical insulating materials for electrical conductors and for plug housings as well as plug connectors.
15. Production of mobile telephone casings having improved resistance to perfume, aftershave and perspiration.
16. Network interface devices.

17. As carrier material for organic photoconductors.
18. For the production of lamps, for example headlight lamps in the form of headlamps, headlight lenses or internal lenses.
19. For medical applications, for example oxygenators, dialysers.
20. For foodstuffs applications, such as, for example, bottles, kitchenware and chocolate moulds.
21. For applications in the automotive sector, where contact with fuels and lubricants can occur, such as, for example, bumpers, optionally in the form of suitable blends with ABS or suitable rubbers.
22. For sports articles, such as, for example, slalom poles or ski boot buckles.
23. For domestic articles, such as, for example, kitchen sinks and letter box casings.
24. For casings, such as, for example, electrical distribution cabinets.
25. Casings for electric toothbrushes and hairdryer casings.
26. Transparent washing machines—bull's-eyes having improved resistance to the washing solution.
27. Safety goggles, optical corrective spectacles.
28. Lamp covers for kitchen appliances having improved resistance to cooking steam, especially oil vapours.
29. Packaging films for medicaments.
30. Chip boxes and chip carriers.
31. For other applications, such as, for example, stable doors or animal cages.

This application likewise provides the moulded bodies and extrudates obtainable from the polymers according to the invention.

EXAMPLES

Example 1

Preparation of a Chain Terminator According to the Invention

1a) Preparation of the Tosylate of a Hydroxy-Terminated Alkylsiloxane Compound

In a round-bottomed flask, 2.44 g (0.02 mol) of 4-dimethylaminopyridine, 11.13 g (0.11 mol) of triethylamine and 100 g (1 mol) of polydimethylsiloxane (MCR-C12; monocarbinol-terminated, manufacturer: ABCR GmbH & Co. KG (D-76187 Karlsruhe, Im Schlehert 10, Germany); molecular weight Mw=1000 g/mol; kinematic viscosity 15-20 cSt)) are placed in 300 ml of dichloromethane (anhydrous), under argon. 18.11 g (0.0950 mol) of toluenesulfonic acid chloride dissolved in 100 ml of dichloromethane are added dropwise at room temperature. When the addition is complete, the reaction mixture is heated for 6 hours under reflux. For working up the mixture, 250 ml of ice-water and 400 ml of dichloromethane are added. The reaction mixture is then adjusted to pH=2 with 10% hydrochloric acid. Washing with water is carried out several times, followed by washing with saturated sodium chloride solution. The organic phase is dried over magnesium sulfate, concentrated and filtered over silica gel with an eluant mixture (n-hexane/ethyl acetate 1:1). The solution is concentrated and the substance is dried under a high vacuum. 96.7 g of a slightly cloudy oil are obtained.

1b) Conversion of the Tosylate from Example 1a into the Chain Terminator with Hydroquinone:

In a round-bottomed flask, 15 g (0.138 mol) of hydroquinone and 6.3 g (0.11 mol) of potassium hydroxide (dissolved in a few ml of water) are placed, under argon, in a mixture of 100 ml of methanol and 500 ml of ethanol. The mixture is heated to 65° C., and 80 g (0.07 mol) of the yellow oil from Example 1a are added dropwise thereto in the course of one hour. Heating under reflux is carried out for 5 hours.

The reaction mixture is diluted with 400 ml of dichloromethane and 600 ml of water, and the phases are separated. The aqueous phase is extracted several times with 200 ml of dichloromethane each time. The combined organic phases are washed a further 3 times with 200 ml of water in each case and subsequently with saturated sodium chloride solution, and drying over magnesium sulfate is then carried out. After concentration, the crude product is filtered over silica gel with an eluant mixture of n-hexane/ethyl acetate (5:1). 53 g of a yellow oil are obtained. $^1$H-NMR (400 MHz; CDCl$_3$): δ=6.72-6.60 (m, 4 H); 4.00-3.95 (m, 2 H); 3.69-3.65 (m, 2 H); 3.45-3.38 (m, 2 H); 1.61-1.54 (m, 2 H); 1.30-1.10 (m, 3 H); 0.82-0.78 (m, 1 H); 0.52-0.45 (m, 3 H); 0.01--0.1 (m (SiCH3) n). The peak positions and the integration are to be considered by way of example, because it is an oligomeric mixture having different molar masses. MALDI-MS: mass peaks of the structural element $C_{17}H_{30}O_3Si[C_2H_6OSi]_n$. The product is used without further fractionation.

Example 2

Preparation of PC According to the Invention

In a one-liter wave-breaker flask having a metal stirrer, a 100 ml dropping funnel filled with 40% sodium hydroxide solution, and a pH electrode, 45.6 g of bisphenol A (0.2 mol) are placed in a solution of 35.2 g (0.88 mol) of sodium hydroxide in 740 ml of demineralised water, while nitrogen is passed in, and stirring is carried out for 5 minutes. After addition of 740 ml of dichloromethane, vigorous stirring is carried out for a further 5 minutes. Then 39.3 g of phosgene are introduced at a rate of 2 g/min at a temperature of 20-25° C. The waste gas is discharged via an activated carbon washing tower. The pH value is maintained between 12-13.5 by addition of 45% sodium hydroxide solution.

When the introduction is complete, hydrogen is passed in for 5 minutes, the stirring speed is increased, and 13.3 g of the product from Example 1 dissolved in 30 ml of dichloromethane are added; after a further 5 minutes, 0.23 g (0.002 mol) of ethylpiperidine dissolved in 20 ml of dichloromethane is added, and stirring is continued for a further 45 minutes. The phases are separated, the organic phase is diluted with 500 ml of dichloromethane, shaken 1× with 15% phosphoric acid (volume org. phase/H$_3$PO$_4$ 1:1) and then washed with demineralised water until the conductivity of the aqueous phase is <15 µS. The organic phase is dried with MgSO$_4$ and filtered. The polycarbonate solution is diluted to 3% with dichloromethane and precipitated with 3 times the amount of methanol. The precipitated polymer is filtered off with suction and dried at 130° C. in a vacuum drying cabinet. 53 g of a fine white powder are obtained. The molecular weight of the material is M$_W$=24,400 g/mol (mass average determined at room temperature by gel permeation chromatography calibrated to BPA polycarbonate with refractive index detector; corresponds approximately to 43,000 g/mol determined with polystyrene calibration).

Measurement of the Elongation Behaviour of Example 2

10 g of the polymer of Example 2 according to the invention were dissolved in methylene chloride and the solution was filtered over a Teflon filter having a pore size of 5 µm. The filtered solution is concentrated and the melt is compressed by means of a hot press (model PW20, Weber) at 240° C. and a pressure of 50 bar to give a film having a thickness of from 65 to 75 micrometers.

The film so obtained is cut into pieces of approximately 2.7 mm×13 mm. These are clamped in a tensile testing machine (Kammrath und Weiss) in clamping jaws coated with suitable abrasive paper. The clamped length is 2.27 mm. The stress-elongation curves are recorded at a rate of elongation of 0.21 min$^{-1}$ at 23° C. The stress-strain curve is calculated taking into account the geometry of the samples (thickness, width and clamped length of the samples). The values for breaking elongation, stress at break and modulus of elasticity are taken from the stress-strain curve. The test is carried out at 23° C.

Example A

Comparison

An aromatic polycarbonate of bisphenol A having tert-butyl phenol as end group is chosen. The molecular weight is $M_w$=23,800 (mass average determined at room temperature by gel permeation chromatography calibrated to BPA polycarbonate with refractive index detector; corresponds approximately to 42,000 g/mol determined with polystyrene calibration).

Measurement of the Elongation Behaviour of Example A

The polycarbonate according to Example A is dissolved in methylene chloride and filtered over a Teflon filter as described in Example 2. The filtered solution is concentrated and the melt is compressed by means of a hot press (model PW20, Weber) at 240° C. and a pressure of 50 bar to give a film having a thickness of from 152 to 165 micrometers. For preparation reasons, a higher thickness was chosen for this polycarbonate sample. Despite the greater thickness, the breaking elongation is lower compared with the example according to the invention (see Table 1). Yield stress and modulus of elasticity are independent of the sample thickness.

The tensile test is carried out as in Example 2.

The following values are obtained for the tests at 23° C.:

TABLE 1

| Example | Breaking elongation (%) | Yield stress (MPa) | Modulus of elasticity (MPa) |
| --- | --- | --- | --- |
| A | 70-105 | 70-78 | 1860-2290 |
| 1 | 122-125 | 52-63 | 2000-2290 |

Determination of the Fire Behaviour

The UL 94-V test (Standard for tests for flammability of plastic materials for parts in devices and appliances—Edition 5 Oct. 29, 1996, Underwriters Laboratories Inc.) is a conventional method for determining fire behaviour. The samples are pretreated as follows:

2 days/23° C./50% relative humidity
7 days/70° C./hot-air oven

Application of flame is carried out by means of a 20 mm high Tirill burner flame. The flame application time is 2×10 seconds. The second flame application time begins as soon as the ignited sample is extinguished; if the sample does not ignite it begins immediately after. The after-burning times after the application of flame, the sum of all the after-burning times, and the after-burning and after-glowing of the samples after the second flame application are determined. Furthermore, it is indicated whether the sample gives off burning drips (cotton wool under the sample ignites).

Example 3

According to the Invention 38 liters of methylene chloride are added to a solution, rendered inert with nitrogen, of 2169 g (9.5 mol) of bisphenol A and 1672 g (41.8 mol) of sodium hydroxide in 38 liters of water. At a pH value of 12.5-13.5 and at 20° C., 1879 g (19 mol) of phosgene are introduced. In order to prevent the pH value from falling below 12.5, 30% sodium hydroxide solution was added during the phosgenation. When the phosgenation is complete, and after flushing with nitrogen, 621 g (0.57 mol) of siloxane compound (prepared according to Example 1) dissolved in one liter of methylene chloride are added, and stirring is carried out for 15 minutes. 9 g of phenol (0.1 mol) dissolved in one liter of methylene chloride are then added. Stirring is carried out for a further 15 minutes, 10.7 g (0.09 mol) of N-ethylpiperidine are added, and stirring is continued for a further one hour. The aqueous phase is separated off, and the organic phase is then acidified with phosphoric acid and washed with distilled water until neutral and free of salt. After exchanging the solvent for chlorobenzene, the product is extruded at 230° C. and 80 rpm and at 0.1 mbar over an evaporating extruder and granulated by means of a granulator. 1990 g of transparent granules are obtained. The molecular weight of the polycarbonate resin is Mw=24,600 g/mol (mass average determined at room temperature by gel permeation chromatography calibrated to BPA polycarbonate with refractive index indicator; corresponds approximately to 44,000 g/mol determined with polystyrene calibration).

The granules are dried for 5 hours in an air-circulating drying cabinet at 120° C. and processed on an injection-moulding machine at 280° C. to test specimens having the dimensions 127.0×12.7×3.0 mm. The test rods are then subjected to a combustibility test according to specification UL 94-V.

TABLE 2

UL 94-V test (conditioning: 2 days/23° C./50% relative humidity)

| Test specimen | t1 [s] After-burning time 1st flame application | t2 [s] After-burning time 2nd flame application | t2 + t3 (t3: after-glowing time) | Test specimen evaluation |
| --- | --- | --- | --- | --- |
| 1 | 2.1 | 7.8 | 8 | does not drip |
| 2 | 4.9 | 22.7 | 22.9 | drips and ignites the cotton wool |
| 3 | 3.9 | 11.2 | 11.4 | drips and ignites the |

TABLE 2-continued

| | UL 94-V test (conditioning: 2 days/23° C./50% relative humidity) | | | |
|---|---|---|---|---|
| Test specimen | t1 [s] After-burning time 1st flame application | t2 [s] After-burning time 2nd flame application | t2 + t3 (t3: after-glowing time) | Test specimen evaluation |
| 4 | 6.8 | 3.1 | 3.3 | cotton wool does not drip |
| 5 | 4.3 | 5.7 | 5.9 | does not drip |

Total after-burning time: (t1 + t2): 72.5 s

TABLE 3

| | UL 94-V test (conditioning: 7 days/70° C./hot-air oven) | | | |
|---|---|---|---|---|
| Test specimen | t1 [s] After-burning time 1st flame application | t2 [s] After-burning time 2nd flame application | t2 + t3 (t3: after-glowing time) | Test specimen evaluation |
| 1 | 5.4 | 5.5 | 5.7 | does not drip |
| 2 | 1.7 | 4.7 | 4.9 | does not drip |
| 3 | 2.4 | 6.7 | 6.9 | does not drip |
| 4 | 2.5 | 4.8 | 5.0 | does not drip |
| 5 | 3.2 | 7.8 | 8.0 | does not drip |

Total after-burning time: (t1 + t2): 44.7 s

Example 4

Comparison Example

A polycarbonate of bisphenol A with tert-butyl phenol as chain terminator, having a molecular weight (mass-average) of Mw=24,800 g/mol (mass average determined at room temperature by gel permeation chromatography calibrated to BPA polycarbonate with refractive index detector; corresponds approximately to 44,000 g/mol determined with polystyrene calibration), is processed on an injection-moulding machine at 280° C. to test specimens having the dimensions 127.0×12.7×3.0 mm. The test rods are then subjected to a combustibility test according to specification UL 94-V.

TABLE 4

| | UL 94-V test (conditioning: 2 days/23° C./50% relative humidity) | | | |
|---|---|---|---|---|
| Test specimen | t1 [s] After-burning time 1st flame application | t2 [s] After-burning time 2nd flame application | t2 + t3 (t3: after-glowing time) | Evaluation of the dripping behaviour of the test specimen |
| 1 | 22 | 3.2 | 3.4 | drips and ignites the cotton wool |
| 2 | 17.4 | 6.3 | 6.5 | drips and ignites the cotton wool |
| 3 | 30.8 | 2.0 | 2.2 | drips and ignites the cotton wool |
| 4 | 1.7 | 9.8 | 10.0 | drips and ignites the cotton wool |
| 5 | 29.3 | 16.6 | 16.8 | drips and ignites the cotton wool |

Total after-burning time: (t1 + t2): 139.1 s

TABLE 5

| | UL 94-V test (conditioning: 7 days/70° C./hot-air oven) | | | |
|---|---|---|---|---|
| Test specimen | t1 [s] After-burning time 1st flame application | t2 [s] After-burning time 2nd flame application | t2 + t3 (t3: after-glowing time) | Test specimen evaluation |
| 1 | >35.1 | — | — | does not drip |
| 2 | 25.8 | 4.8 | 5.0 | drips and ignites the cotton wool |
| 3 | >35.1 | — | — | does not drip |
| 4 | 30.9 | 5.4 | 5.6 | drips and ignites the cotton wool |
| 5 | 27.5 | 29.4 | 29.6 | drips and ignites the cotton wool |

Total after-burning time: (t1 + t2): >194 s

It can clearly be seen that the polycarbonate according to the invention has markedly shorter after-burning times and improved dripping behaviour (produces fewer readily flammable drips). The relatively short after-burning times in the column "After-burning time 2nd flame application" in Tables 4 and 5 (comparison example) are explained by the fact that the sample is burnt away almost completely or drips away almost completely during the first flame application.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

We claim:

1. A polycarbonate, polyester carbonate and polyester which comprises a phenolic structure of formula (1) as end group

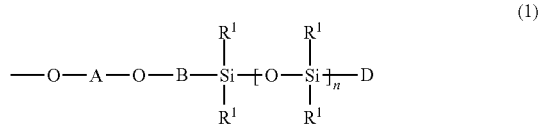
(1)

wherein
A represents an optionally substituted aryl radical,
B represents $C_1$-$C_{12}$-alkyl or $C_1$-$C_{12}$-alkoxyalkyl,
$R^1$ independently represents $C_1$-$C_{12}$-alkyl or $C_6$-$C_{12}$-aryl,
D represents $C_1$-$C_{12}$-alkyl or $C_6$-$C_{12}$-aryl, and
n represents a number (mean value) from 0 to 300.

2. The polycarbonate, polyester carbonate and polyester according to claim 1, wherein A represents

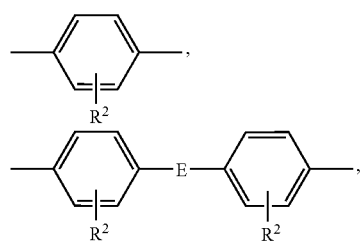

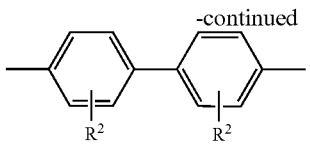

$R^2$ independently represents hydrogen, $C_1$-$C_{18}$-alkyl, $C_1$-$C_{18}$-alkoxy, Cl, Br or an optionally substituted aryl or aralkyl radical,
E represents a single bond, —$SO_2$—, —CO—, —O—, —S—, $C_1$- to $C_6$-alkylene, $C_2$- to $C_5$-alkylidene or $C_5$- to $C_6$-cycloalkylidene, which can be substituted by $C_1$- to $C_6$-alkyl, or E represents $C_6$- to $C_{12}$-arylene, which can optionally be fused to further aromatic rings containing hetero atoms, and
B represents $C_1$-$C_{12}$-alkyl or $C_1$-$C_{12}$-alkoxyalkyl.

3. The polycarbonate, polyester carbonate and polyester according to claim 2, wherein
E represents a single bond, $C_1$- to $C_5$-alkylene, $C_2$- to $C_5$alkylidene, $C_5$- to $C_6$-cycloalkylidene, —O—, —SO—, —CO—, —S— or —$SO_2$—,
or E represents a radical of formula (1a) or (1b)

(1a)

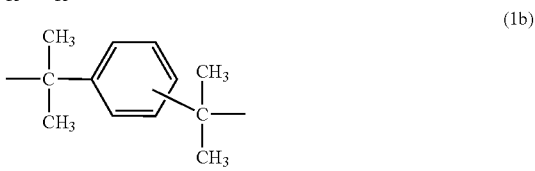
(1b)

wherein
$R^8$ and $R^9$ can be chosen individually for each $X^1$ and represent, independently of one another, hydrogen or $C_1$- to $C_6$-alkyl, and
$X^1$ represents carbon and
p represents an integer from 4 to 7, with the proviso that $R^8$ and $R^9$ are simultaneously alkyl on at least one atom $X^1$, and
B represents $C_1$-$C_6$-alkyl or $C_1$-$C_6$-alkyloxy-$C_1$-$C_6$-alkyl.

4. The polycarbonate, polyester carbonate and polyester according to claim 1, wherein O-A-O is derived from hydroquinone, 4,4'-dihydroxydiphenyl, 1,1-bis-(4-hydroxyphenyl)-phenyl-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC), B represents ethyl, propyl, butyl, propoxypropyl, butoxypropyl, propoxyethyl, ethoxyethyl or ethoxypropyl, $R^1$ represents methyl or phenyl, D represents methyl, ethyl, n-propyl or isopropyl, and n represents a number (mean value) from 10 to 100.

5. The polycarbonate, polyester carbonate and polyester according to claim 4, wherein O-A-O is derived from hydroquinone, bisphenol A and bisphenol TMC.

6. The polycarbonate, polyester carbonate and polyester according to claim 5, wherein O-A-O is derived from hydroquinone.

7. The polycarbonate, polyester carbonate and polyester according to claim 1, which comprises from 0.5 to 8 mol % phenolic structures of formula (1).

8. The polycarbonate, polyester carbonate and polyester according to claim 7, which comprises from 2 to 6 mol % phenolic structures of formula (1).

9. The polycarbonate, polyester carbonate and polyester according to claim 1, wherein the polycarbonate has a weight-average molecular weights of from 5000 to 200,000, the polyester carbonate has a weight-average molecular weights of from 10,000 to 250,000 and the polyester has a weight-average molecular weights of from 25,000 to 70,000.

10. The polycarbonate, polyester carbonate and polyester according to claim 9, wherein the polycarbonate has a weight-average molecular weights of from 10,000 to 80,000.

11. The polycarbonate, polyester carbonate and polyester according to claim 1, which further comprises one or more additives selected from the group consisting of the UV stabilisers, heat stabilisers, antistatics, pigments, colourings, mould release agents, flow improvers, flameproofing agents, fillers and impact modifiers.

12. A molding which comprises the polycarbonate, polyester carbonate and polyester according to claim 1.

13. A process for the preparation of the polycarbonate, polyester carbonate and polyester which comprises reacting a polycarbonate, a polyester carbonate and a polyester with a phenolic compound of formula (1)

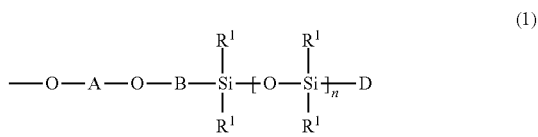

wherein

A represents an optionally substituted aryl radical,

B represents $C_1$-$C_{12}$-alkyl or $C_1$-$C_{12}$-alkoxyalkyl, $R^1$ independently represents $C_1$-$C_{12}$-alkyl or $C_6$-$C_{12}$-aryl, D represents $C_1$-$C_{12}$-alkyl or $C_6$-$C_{12}$-aryl, and n represents a number (mean value) from 0 to 300, wherein the compound of the formula (1) is used as a chain terminator.

* * * * *